United States Patent [19]

Hobbs

[11] Patent Number: 4,696,151
[45] Date of Patent: Sep. 29, 1987

[54] SEPARATOR SYSTEM FOR PEANUT COMBINE

[75] Inventor: Oliver K. Hobbs, Suffolk, Va.

[73] Assignee: Hobbs-Adams Engineering Company, Suffolk, Va.

[21] Appl. No.: 783,133

[22] Filed: Oct. 2, 1985

[51] Int. Cl.⁴ .................. A01F 12/44; A01D 41/00
[52] U.S. Cl. .................................................. 56/14.6
[58] Field of Search ............ 56/14.6, 295; 130/30 C, 130/30 R, 27 HF

[56] References Cited

U.S. PATENT DOCUMENTS

| | | | |
|---|---|---|---|
| 828,736 | 8/1906 | Gwaltney | 130/30 C |
| 1,175,000 | 3/1916 | Lilliston | 130/30 C |
| 2,454,156 | 11/1948 | Good | 130/30 C |
| 2,632,290 | 3/1953 | Anderson | 171/120 |
| 2,943,629 | 7/1960 | Carruthers | 130/30 R |
| 2,970,599 | 2/1961 | Jeantil | 130/27 R |
| 2,974,467 | 3/1961 | Long | 130/30 C |
| 3,176,455 | 4/1965 | Buchanan | 56/295 |
| 3,664,349 | 5/1972 | Quick | 130/27 HF |
| 3,795,248 | 3/1974 | Long | 130/30 C |
| 3,813,184 | 5/1974 | Temple et al. | 130/27 HF |
| 4,136,507 | 1/1979 | Hobbs | 56/16.6 |
| 4,353,376 | 10/1982 | Schuler | 56/14.6 |

Primary Examiner—Paul J. Hirsch
Attorney, Agent, or Firm—Stevens, Davis, Miller & Mosher

[57] ABSTRACT

A peanut combine having an improved separator system employing a series of parallel shafts all rotating in the same direction, each carrying a plurality of disks and a blower to separate the chaff from the peanuts. The disk assembly is substantially horizontal. The disks are offset relative to the disks on adjacent shafts so that disks on the two shafts interdigitate. The action of the rotating disks and the blower on the material flowing over the disks provides a more efficient cleaning mechanism for the peanuts.

16 Claims, 8 Drawing Figures

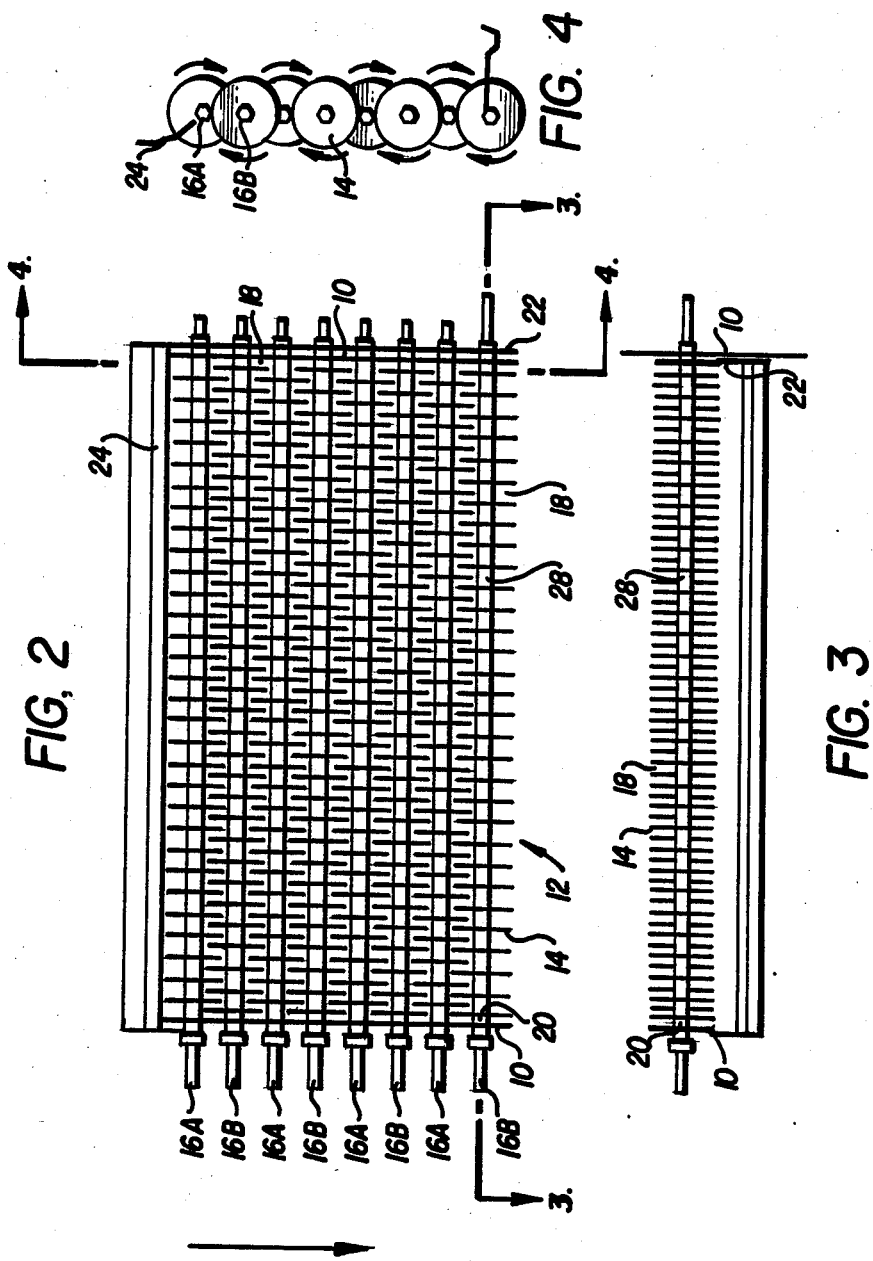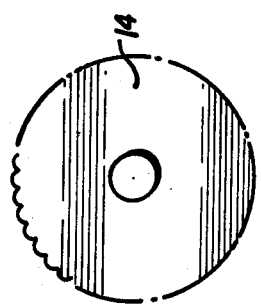

SEPARATOR SYSTEM FOR PEANUT COMBINE

BACKGROUND OF THE INVENTION

1. Field of the Invention

This invention relates to a very efficient peanut combine, and more particularly to an improved means for separating chaff from peanuts to provide a cleaner peanut product.

Peanuts are generally difficult to mechanically harvest and cure to a condition where they can be stored and still retain high quality standards for human ingestion. Like any other food product, when peanuts are exposed to foreign material, contamination, spoilage and deterioration may be accelerated. To compound this problem, peanuts cannot be washed, for the presence of water will enhance deterioration. As a result, peanut hulls remain dirty, even under the most favorable conditions, and if such dirt is allowed to come into contact with the edible seed of the peanut, contamination will occur, rendering the nut almost worthless.

To prevent abrasions and contamination of the edible seed, peanut pods with their fragile hulls must stay intact throughout the digging, windrowing, curing, combining, handling and transporting processes until they enter a shelter.

2. Description of the Prior Art

After peanuts have been detached from vines, they must be separated from the vines in such a manner that the peanuts can be removed to a hopper or bin with a minimum or absence of any foreign material. Conventional peanut combines utilize a screening system for separating the peanuts from the vine fragments, and a straw rack for moving the vine fragments to the rear of the combine where they are discharged over the ground. After separation, the peanuts are passed over a series of vibrating screens and stem cutters to remove foreign substances. The peanuts are then discharged from the bottom of the combine, after the stems have been removed, and transferred to a suitable bagging apparatus or to a bin carried by the combine. Although this method of separating the peanuts has proved to be somewhat successful in providing a cleaner product, there is still a need for a separator system which will produce an even a cleaner peanut sample and reduce the loss of acceptable peanut products. There is also a need to provide a machine which can speed the process of harvesting peanuts, even under the most adverse conditions.

A very successful peanut combine, having elements as described above, is disclosed and claimed in my U.S. Pat. No. 4,136,507, which is incorporated herein by reference. This patent discloses and claims an improved thrashing or picking system for a peanut combine, which is adapted to shred the vines and detach peanuts therefrom without damaging the peanuts.

The use of a rotary disk system as a separator for cleaning grain, wood chips, legumes and the like is known in the art. For example, U.S. Pat. No. 2,632,290 to Anderson discloses a peanut harvesting machine having a plurality of rotary disk screens which are secured to shafts rotatably mounted to the frame of the combine. The disks, closely spaced, are slightly interdigitating and are mounted off-center on their shafts to increase the shaking action of the peanuts being conveyed over the screen to aid in the separation of soil from the peanuts. These disks, positioned close to each other, convey peanuts over one another to a shaker screen to loosen dirt which is also conveyed over the disks. The disk screen is not used in conjunction with an air separating system.

U.S. Pat. No. 4,037,723 to Wahl is directed to a disk screen separator for separating wood pulp chips from knots, or wood chunks, or screening ground waste to separate larger particles from other types of processing.

U.S. Pat. No. 758,508 to Mason discloses a grain separating device which can employ a series of interleaved square sheets that revolve to separate grain from stalk.

U.S. Pat. No. 828,736 to Gwaltney discloses the use of a series of blunt tooth disks mounted on shafts which protrude above a bedplate. These disks are marginally interdigitating and work by grabbing the stem on a peanut to remove it, and then the disks force the stem below the bedplate.

U.S. Pat. No. 836,869 to Deaver discloses the use of a series of rimmed disks on a shaft having two sets of teeth per disk. Grain is separated from straw as the straw is torn while moving over the disk.

U.S. Pat. No. 3,985,233 to Sherman discloses a seedling cleaning system, also employing a series of rotary disks mounted on shafts. The disks are eccentrically mounted to provide for increased agitation of the seedlings in order to remove soil from the seedling root.

U.S. Pat. No. 2,257,352 to Silver discloses a series of rotary screen members mounted in a staggered manner upon shafts. The rotary shafts are in a slightly axially spaced relationship, the spacing being such that a sugar beet will not drop through the spacing as it is being conveyed, but dirt and trash will.

U.S. Pat. No. 4,239,119 to Kroell is directed to a disk separator comprised of a series of interdigitating disks on shafts.

It is an object of this invention to provide a peanut combine with an improved separating system which is adapted to produce a cleaner peanut sample and reduce the loss of acceptable product.

Another object of the invention is a peanut combine with an improved separator system which utilizes rotating disks.

Additional objects and advantages of this invention will become apparent to those skilled in the art from the study of this specification and of the appended claims.

SUMMARY OF THE INVENTION

These and other objects have been attained according to this invention by providing a separator employing a unique series of rotating disks in combination with a blower to separate chaff from peanuts. The series of disks are mounted on a plurality of parallel shafts, with the disk assembly being substantially horizontal. The material flows in the same direction as the rotation of the disks. Disks are offset relative to disks on adjacent shafts so that they interdigitate. This interdigitating forms a series of openings with lengths equal to the distance between adjacent shafts, and widths equal to the distance between adjacent disks. These openings allow peanuts to fall through the assembly, between the adjacent disks, but only after the peanuts have been subjected to a tumbling action to remove chaff and other debris.

BRIEF DESCRIPTION OF THE DRAWINGS

FIG. 2 is a top plan view of the improved separator of the present invention;

FIG. 3 is an enlarged sectional view of the separator of the present invention taken along line 3—3 of FIG. 2;

FIG. 4 is a side sectional view of the separator of the present invention taken along line 4—4 of FIG. 2;

FIG. 5 is a side view of an individual disk of the present invention;

DESCRIPTION OF THE INVENTION

Figure 1:
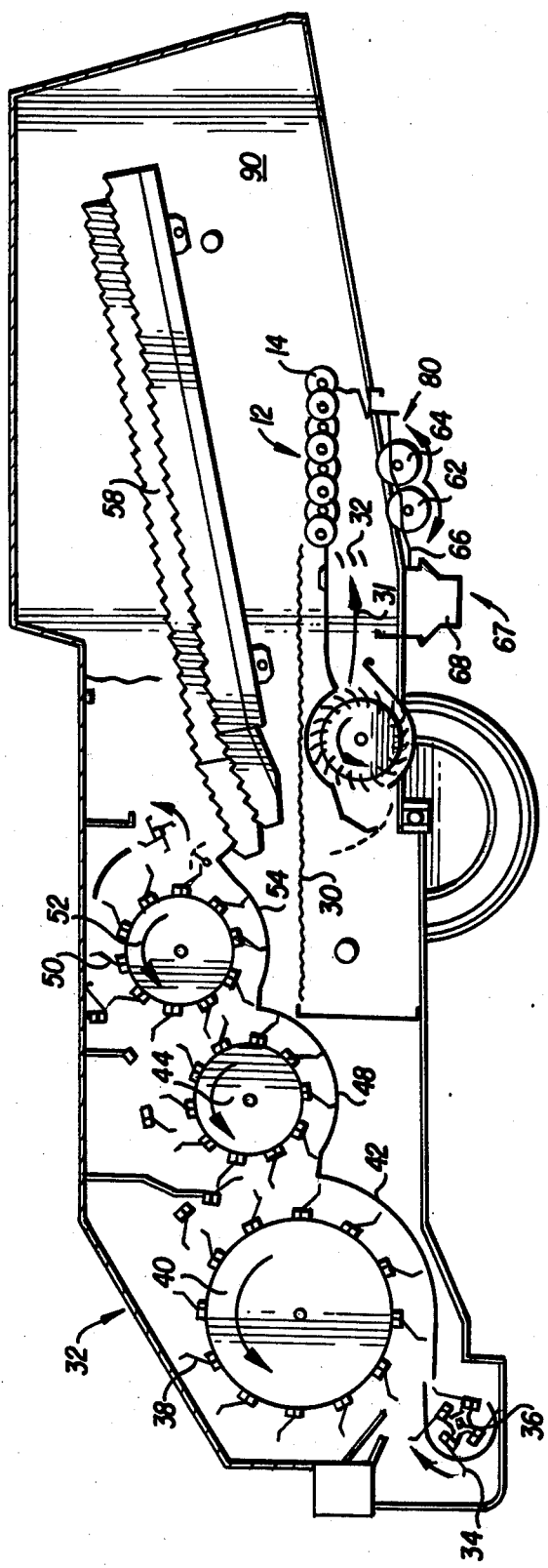
FIG. 1 is a side elevation view of a peanut combine provided with one of the preferred embodiments of the roller disk separator system.

The foregoing objects and others are accomplished in accordance with this invention by providing a peanut combine having a vine pick-up cylinder for lifting peanut laden vines from a windrow as the combine is towed over the windrow. The combine also has a thrasher system having a series of three longitudinally spaced rotatable thrasher cylinders, with the first two cylinders of the series disposed above screens which permit dirt and other material smaller than a peanut to pass therethrough. A third cylinder is disposed above a screen which will permit peanuts to pass therethrough. The thrashing cylinders are employed in conjunction with a series of vine flow guides, and intercepting means disposed about the thrashing cylinders which assists the thrasher cylinders in shredding the vines and detaching the peanuts therefrom.

A first thrashing cylinder, having an enclosed parallelepiped shaped vine carrier disposed about its shaft and carrying flexible spring fingers spaced radially outwardly of its vine carrier for moving the vine mass lifted by the pick-up cylinder into the thrashing chamber, is disposed in the thrashing chamber immediately behind and above the pick-up cylinder. The second and third thrashing cylinders may be conventional open cylinders having circumferentially spaced transverse bars which define the periphery thereof and carry flexible spring fingers adapted to mesh with the fingers on the first drum to shred peanut vines passing through the thrashing chamber. The first thrashing cylinder is preferably larger in diameter than the second and third thrashing cylinders. The second thrashing cylinder is rotated faster than the first cylinder and slower than the third thrashing cylinder. A plurality of stripper bars and cylinders are disposed above and between the thrashing cylinders to intercept the vine mass carried over the cylinders, and with a vine control guide disposed in front of the first thrashing cylinder and above the vine pick-up cylinder, which prevents peanuts from falling out of the combine through the opening provided for the vine pick-up cylinder. The combine is also provided with a straw rack for carrying vine fragments after they are separated from the peanuts to the rear of the combine where they drop to the ground. The combine has a means responsive to the volume of vines carried over the third thrashing cylinder for varying the volume of straw deposited on the straw rack. An inclined series of stepped metal plates are positioned under the screen to receive the peanuts which fall from below the third thrasher cylinder. A detailed description of the component parts of the aforementioned peanut combine is found in my aforementioned U.S. Pat. No. 4,136,507, the disclosure of which is hereby specifically incorporated by reference, and which is relied upon for details.

The inclined stepped metal plates carry the peanuts to the disk separator. It is contemplated that other devices can be used to convey peanuts to the disk separator, such as a driven endless belt or the like. An important aspect of the present separator is a unique series of rotating disks used in conjunction with a blower system. The series of disks are mounted on a plurality of positively driven parallel shafts, with the disk assembly being substantially horizontal. The material flow is in the same direction as the rotation of disks, which is opposite to the direction of travel of the moving combine. Disks are offset relative to disks on adjacent shafts so that they interdigitate. These disks form a series of slots with lengths equal to slightly greater than the distance between adjacent shafts, and approximate widths equal to the distance, determined by spacers, between adjacent disks. These slots allow peanuts to fall through the assembly between adjacent disks.

The separator can be used alone to great advantage in many separating operations. It is, however, used to great advantage in combination with a blower or aspirator system in the peanut combine. Addition of the blower system causes unwanted light chaff, which is small enough to pass through the accept openings of the disk separator, and which would otherwise be accepted, to be lifted out of the product by a controlled stream of air and discharged from the machine.

The peanuts are discharged through a hopper and a discharge funnel into a pneumatic conveyor, which transfers the peanuts without significant damage thereto from the bottom of the combine to a storage bin, at the top of the combine housing. The thrashing system of this invention may be used in combination with any suitable apparatus for discharging the vine fragments after the peanuts have been separated therefrom, any apparatus for de-stemming the peanuts and any means for collecting the peanuts discharged from the combine, but it is preferably used on a combine provided with the pneumatic conveyor described and claimed in my U.S. Pat. No. 4,162,811, entitled "Pneumatic Conveyor", the disclosure of that patent being incorporated herein by reference thereto.

DETAILED DESCRIPTION OF THE DRAWINGS

Figure 6:
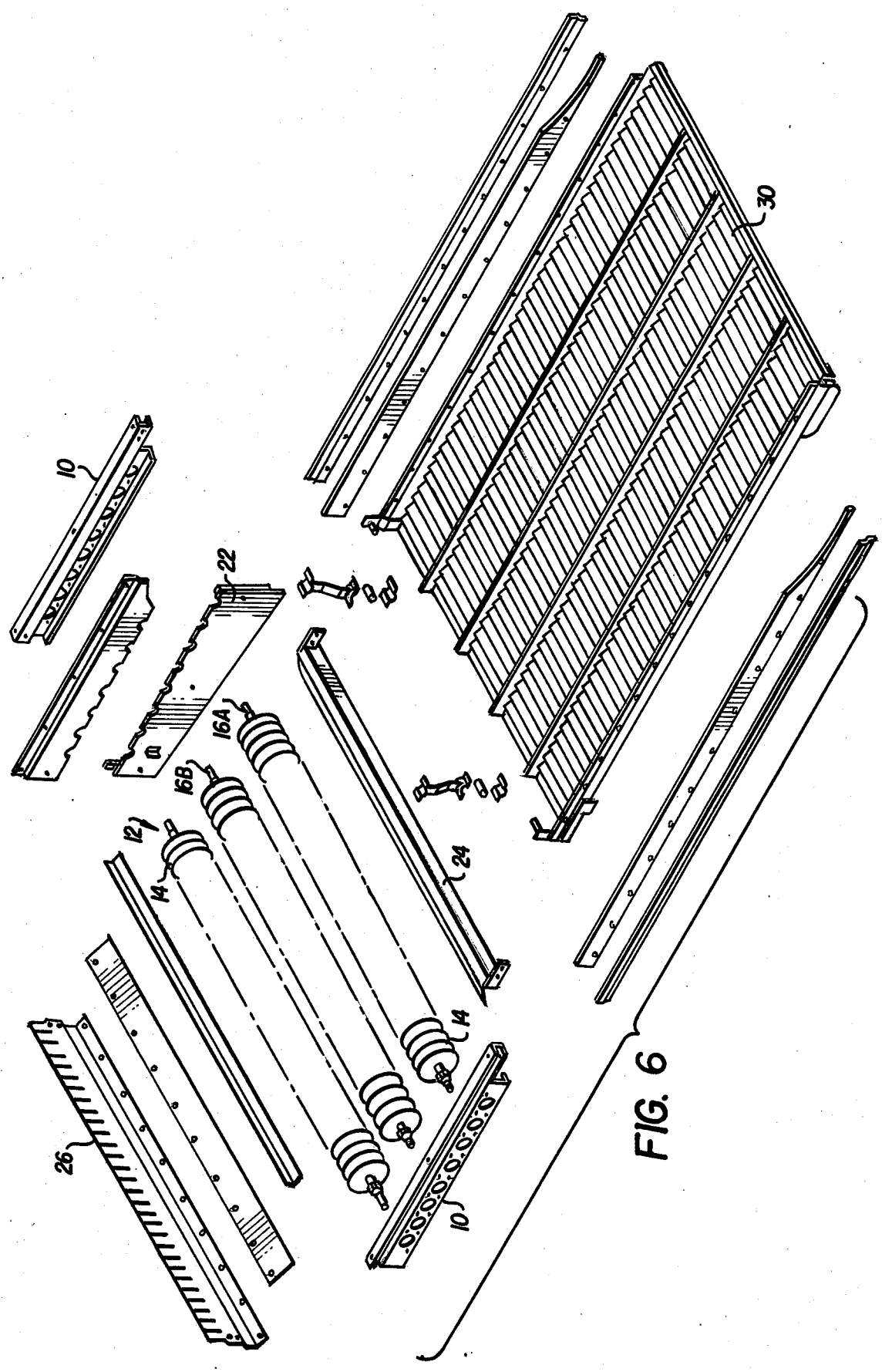
FIG. 6 is an exploded perspective view of the separator section/cleaning tray of the present invention.

Referring now to the drawings, and in particular Figs. 2 and 6, the new and improved separator system will now be described. The disk separator includes mounts 10 and a plurality of rotatable disk assemblies 12 supported on mounts 10.

Each disk assembly 12 includes disks 14. The disks are positioned on shafts 16a, 16b, and each disk is separated by a spacer 28. The spacers 28 have a length so as to give a spacing between adjacent disks for passage of a peanut. The disk assemblies are then rotatably mounted on mounts 10, as shown in Fig. 6. However, each subsequent disk assembly is positioned so that the disks on a second shaft 16b are positioned between the disks on a first shaft 16a which are separated by spacers 28. Adjacent shafts are separated by a distance as measured from the center of each shaft. The radius of each disk is almost that of the spacing between shafts, thus leaving only a small space between the periphery of a disk and the spacer of the shaft adjacent it. The placement of disk assemblies in this manner creates interdigitating disks having peanut-sized openings 18. Generally, any two disks on a like shaft and an interdigitating disk on an adjacent shaft will create two such small openings 18, as best shown in FIG. 2. Equal size openings, referred to as acceptors, are formed all the way across the operating width of the separator by placing shafts adjacent to each other in the above-described manner. As can be seen in FIG. 2, at each end of alternate shafts, a short spacer 20 is provided which causes the end disk to become almost flush with the end interdigitating disk on an adjacent shaft. This arrangement thus terminates the small openings and prevents material from becoming lodged between the disks and the side housing 22 of the combine.

As shown in FIGS. 2 and 4, when rotary motion is imparted, all disks being driven in the same direction, to the disks by a suitable drive assembly, that part of each disk which serves as a boundary for an acceptor or opening moves in the opposite direction of the section of another disk which forms the opposing boundary. This arrangement prevents oversized debris or soil-caked peanuts, or peanuts still attached to vine parts, or peanuts intermingled with vine parts from being accepted by that particular opening. The combination of motion and small openings are designed only to accept particles which are of a size equivalent to, or less than, the dimensions of a desired peanut. Any particle of size greater than these dimensions is conveyed past a first set of openings, over the disks, to a second set of openings positioned downstream from the first set. The motion over the disks to reach the second set of openings causes peanuts to lose chaff and caked soil, and to become free of vines and vine parts. When a peanut has lost its foreign material and has reached the desired dimensions mentioned above, it will be accepted through openings 18. Soil-laden peanuts and other large debris will be conveyed to the next and subsequent sets of openings to again be sized for acceptance.

As best illustrated in FIG. 5, the outer periphery of most or all of the disks 14 are preferably notched or serrated to promote better movement of material under adverse conditions, such as when the front end of the separator may be low, caused, for instance, when the combine is operated on a forward-sloping grade. The serrated edges are blunt, as opposed to being sharp. These edges not only help in conveying peanuts, but impart to them a slight agitation so that chaff can be successfully removed for chaff-laden peanuts. The blunt serrated edges are designed to not harm the peanut shell.

At openings 18 through which the accepted material flows, the disk movement is in opposite directions. Because the disks have smooth side surfaces, which make traction comparatively low, stones and other hard particles which may be close to the maximum thickness acceptable through openings 18 could be rotated between disks 14, causing the disks to be slightly flexed. For this reason, it is important to have a disk made from flexible material, such as, for example, spring steel. If a stone or other hard particle causes a disk 14 to be deflected, it will spring back to its original position.

The presence of a counter-rotating disk on an adjacent mandrel between each pair of disks on the same mandrel, which serves to form openings through which acceptable material will pass, eliminates plugging. Should a particle start to become lodged between two disks 14 on the same mandrel 16, the rotation of the disk 14 on an adjacent downstream mandrel 16 which rotates between the first two disks, would cause it to become dislodged.

At the upstream end of the disk separator shaft, where no adjacent disk shafts are present, and positioned just downstream of the inclined step tray 30, is a front slotted plate 24 fitted over and between the disks to guide material onto the front of the disk separator.

Disk shafts 16a and 16b are rotated at a rate which promotes adequate material movement at a speed less than that which would cause the material to be thrown across downstream rotating disks or to be bounced around. This speed, which can be adjusted depending on the moisture content and the weight of particles being conveyed and is manually set at an optimum, as determined by trial and error, so that the most efficient separation of debris from peanuts is obtained. In view of the optimum speed, the flow of material is fast and sizing is very efficient. The material fed into the disk separator contacts the first rows of rotating disks 14, where most separation usually occurs. If large amounts of material are loaded onto the separator, this material starts to be broken up at the front of the separator and is moved towards the discharge end of the system at a constant rate of speed. As the material moves downstream, it is engaged from the bottom by alternate disks, which will cause a clump of material to fall apart, and each particle to be presented to openings 18 a number of times for sizing. The material conveyed upon reaching the fourth disk assembly has usually been stripped of all peanuts. The peanuts, having been accepted by openings 18, are further processed, as described below. The remaining material is conveyed over the disk assemblies to the rear of the disk separator. A rear slotted plate 26 fits between the rotating disks of the disk assemblies and discharges unaccepted debris to the ground at the rear of the combine through the rear opening of the combine 90 in the same manner as the stripped vines are discharged after being conveyed by the straw walkers.

Although the disk separator of the present invention works effectively to separate material when operating alone, its performance is greatly enhanced by the addition of an aspiration system, shown in FIG. 1, which operates within and in harmony with the mechanical separating system. In combination with the aspiration system, an air stream 31 (FIG. 1) is directed through air vanes 32, which are under and slightly forward of disk assemblies 12, in such a way that air will pass up between the disks 14 in a uniform flow over the surface of the disk assembly, causing leaves, vines and other light chaff to be lifted out of the desired peanuts and thus to be separated and blown out with the mechanically separated reject material. As material is fed onto the upstream end of the disk assembly in a layer, large material or matted material will bridge adjacent disk assemblies 12 and ride the tops of the disks 14, while loose material drops through openings 18. If light enough, the material will be lifted by the air stream above the downstream disk assemblies and moved to the rear of the separator directed by the airflow given direction by air vanes 32.

Air is allowed to pass downstream as a result of disk spacers 28, which create a space between the outer perimeters of adjacent disks 14. The material layer is broken up by agitation of the disks and the air stream as the material is moved. Under average operating conditions, all material is separated by the time it passes the third row of disks; however, a number of additional rows may be provided to assure separation of matted or thick layers of material.

Usually, the material is fed in a comparatively thin layer and the air stream will lift the light material, causing it to be separated without the light material being subjected to mechanical sizing. Utilizing air vanes and air friction, which affects the air stream jet velocity to control the air flow, a stream of air is directed through the front section adjacent front slotted plate 24 of the separator at adequately high velocity, with the velocity of air slowly decreasing as it passes through each downstream mandrel. Material which, due to specific gravity, air drag and other characteristic fluctuations, cause it to move downstream, is subjected to lower air velocity and may be accepted as it traverses the downstream section of the separator, where air velocity through the openings is lower. Higher air velocity at the front section assists in breaking material up for separation and preventing heavy material from crossing the light material to be forced through the openings. Air velocity differential between the front and rear sections of the separator does not have to be as great in the separator system of the present invention, as compared to conventional systems, because the matted or heavy layers of material are supported above the air stream, and do not depend on airflow to move the material across a chaffer or to break the material down for efficient separation. It is to be noted that when sufficient air velocity is used on conventional systems to break an average load of material down, great care must be used in adjusting air flow for full load operation to prevent accepted particles from being blown out when the separator is lightly loaded. Further, overloaded conditions on conventional systems cause air flow to be plugged through the overloaded section of a conventional chaffer.

For the sake of complete disclosure, in a particular preferred embodiment, a disk separator and accompanying blower were constructed as follows:

The disk separator section was about 53" wide and 26" long, with 8 mandrels, each carrying 32 flat disks of 5¼"diameter, spaced apart by spacers about 1½" long and 1¼" in diameter.

Each disk had a thickness of 0.043", resulting in rectangular peanut openings of about ¾" wide and 2" long.

Each disk mandrel or shaft was driven by a chain drive with two sprockets on all but the last mandrel, and a series of short chain drives linking one mandrel with the next adjacent mandrel, etc., and the mandrels are driven to rotate at a speed of less than 100 RPM's.

The perifphery of each disk had a clearance of about 1/16" to the adjacent spacers of the next mandrel.

The blower rotor was about 18" in diameter and about 57" wide, that is, slightly wider than the disk separator section so as to concentrate the airflow and avoid eddy currents, etc.

The air vane had three foils, each extending across the entire width of the duct interconnecting the fan blower and the separator unit and spaced about 4"-6" downstream from the blower. The blower is of the induction or cross-flow type, that is, its inlet extends across the entire width on the side opposite the outlet, thus ensuring a uniform airflow across the width of the duct. The air vane is arranged to direct a flow which is generally uniform over the surface of the disk separator, but with a slightly greater flow at the upstream end, as compared with the downstream end.

It is, of course, important that the airflow be of low enough velocity to avoid interference with the descent of peanuts through the separator, but at the same time to blow away any lighter foreign matrial.

Figure 7:
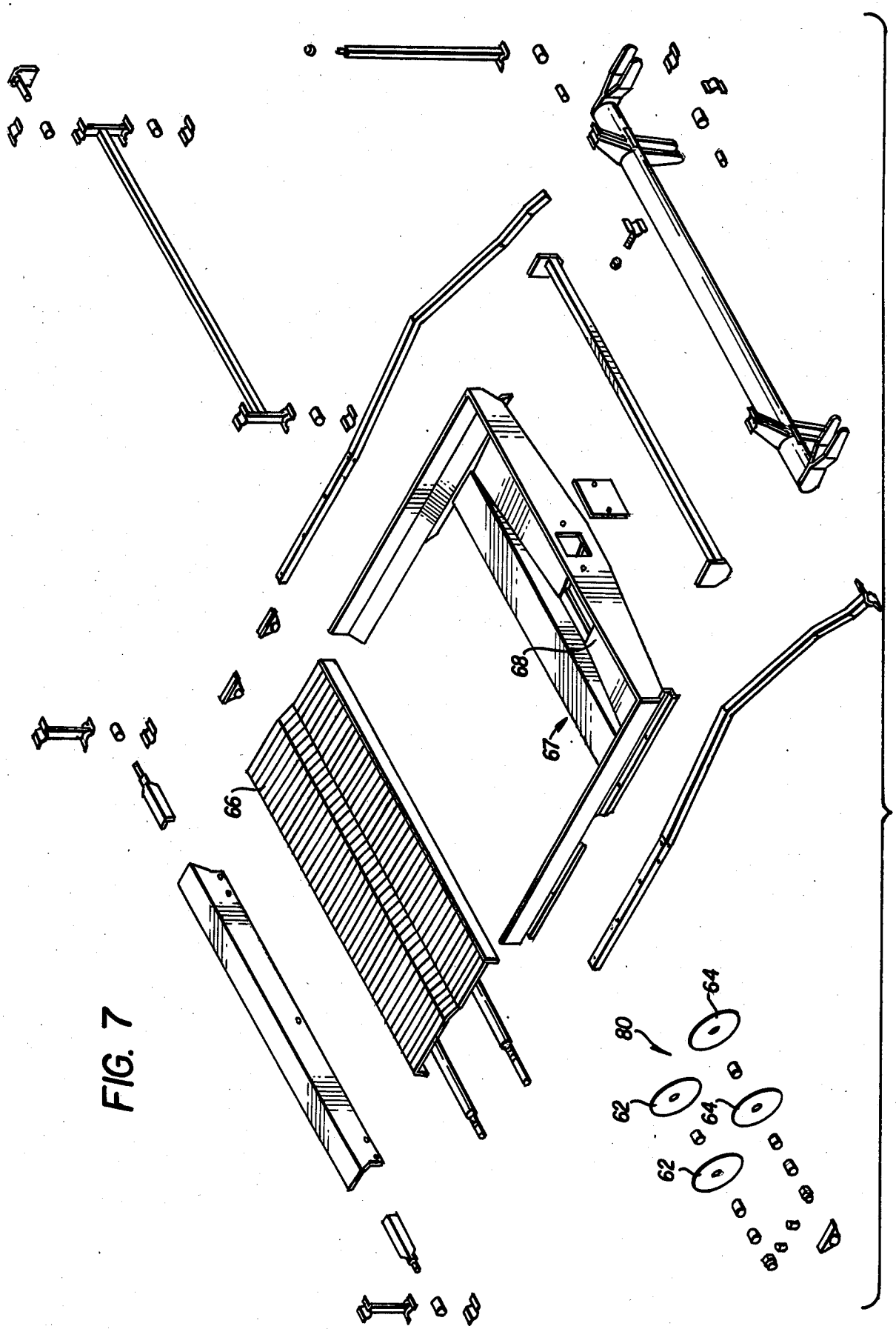
FIG. 7 is an exploded perspective view of the stemmer section of the present invention.

The peanuts accepted through openings 18 are directed to destemmer unit 80, shown in FIGS. 1 and 7. The destemmer unit is composed of a series of cutting disks 62 and 64, which protrude between slots of the stemmer unit bottom 65 which supports fallen cleaned peanuts between the transversely spaced slots, as shown in FIG. 7. The transverse spacing of the cutter disks 62 and 64 is such that peanuts roll therebetween and expose their remaining stems to the cutting disks. The stems are cut by the rotating disks and the stems fall through the slots, out of the combine. The peanuts roll to the hopper 67 and into funnel 68 and are swept by an air stream at high velocity away from the funnel 68 into a storage bin or hopper (not shown).

Referring to FIG. 1, the operation of the combine system will be described. FIG. 1 discloses a combine 32. In operation, peanut-laden vines are picked up by fingers 34 of cylinder 36 and carried to flexible spring fingers 38 of rotating cylinder 40, which carry the vines over screen 42 and lift them to the space between cylinders 40 and 44. Loose soil falls through the perforations in screen 42. Downwardly moving fingers 46, carried by cylinder 44, intercept the vines as they are carried upwardly by fingers 38. As the vines are carried by the action of fingers 46, additional loose dirt falls through screen 48.

The vines are carried upwardly from screen 48 and engaged by springs 50 of cylinder 52. The interaction of cylinders 40, 44 and 52 act to tear and shred the vines from the peanuts. The peanuts fall through screen 54 to an inclined cleaning tray 30, which is shaped in a step-metal fashion immediately below screen 54 and extends to the above-described rotatable disk separator system of the present invention. The shredded vines, which remain on sprigs 50, fall on straw walker 58 and are carried to the rear opening 90 of the combine and discharged to the ground by the eccentric movement of the straw rack 58. The peanuts are separated from the chaff in the separator of the present invention as described above, and fall through openings 18, a stream of countercurrent airflow is blown through the opening of the disk separator, as described above.

Figure 8:
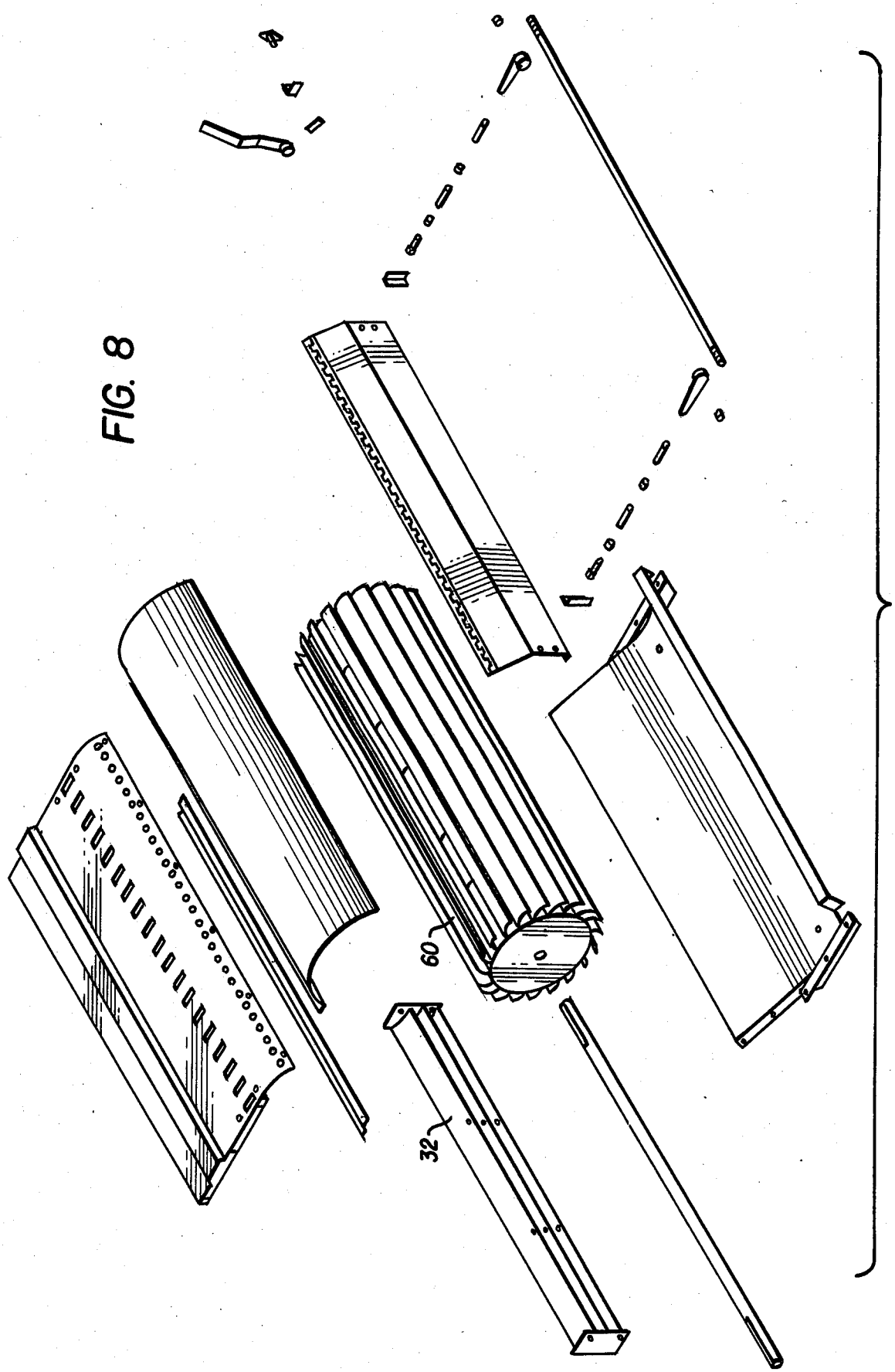
FIG. 8 is an exploded perspective view of the blower section of the present invention.

The countercurrent airflow is caused by the action of fan 60, as shown in FIGS. 1 and 8, and moves air through openings 18 of the rotatable disk assemblies 12 to blow chaff from the peanuts. The fan assembly is positioned upstream and vertically below the disk assembly, as shown in FIG. 1. This fan is preferably an induction-type blower, as previously discussed, which is substantially the same width (transversely across the combine) or slightly wider than the disk separator section.

The peanuts falling through openings 18 between adjacent rotatable disk assemblies 12 are conveyed to a de-stemmer, having cutting disks 62 and 64 protruding between slats which form a gratting 66 about disks 62 and 64, for supporting peanuts between the transversely spaced cutting disk.

After stem removal, the peanuts fall through a hopper 68 into a funnel (not shown) and are swept by an air stream at high velocity away from the funnel into a storage bin or hopper (not shown).

Although the invention has been described in detail for the purpose of illustration, it is to be understood that such detail is solely for that purpose and that those skilled in the art can make variations therein without departing from the spirit and scope of the invention, except as it may be limited by the claims.

I claim:

1. A peanut combine having means for lifting peanut-carrying vines from the ground and a series of means for thrashing the peanuts from the vine, a screen below the last thrashing means which will permit peanuts to fall therethrough and retain vine remnants, and means downstream of said last thrashing means for separating the peanuts from associated foreign material, said separating means comprising:
   a disk separator having a plurality of parallel shafts mounted for rotation in a generally horizontal plane;
   each shaft carrying a plurality of disks spaced along its length, with the distance between adjacent shafts and the spacing of the disks along adjacent shafts being such that the disks interdigitate to form a plurality of openings between adjacent disks of a size and shape which will permit a peanut to pass therethrough and the space between each disk periphery and the adjacent shaft defining a close fit so that a peanut cannot pass therethrough;
   means for driving said shafts so that they all rotate in the same direction; and
   blower means for directing a stream of air to pass upwardly and rearwardly through said disk separator, said stream of air being of a velocity to carry lightweight foreign material up and away from the disk separator so that it does not pass therethrough, but permitting passage of peanuts through the openings.

2. The combine of claim 1, including at least three shafts.

3. The combine of claim 1, in which at least some of said disks have serrated edges.

4. The combine of claim 1, in which at least some of the disks are made of a flexible and springy material.

5. The combine of claim 1, in which the blower means is located upstream of and below the disk separator.

6. The combine of claim 5, including an air vane between the blower means and the disk separator for orienting the distribution of air over the lower surface of the disk separator.

7. The combine of claim 1, in which the blower means is of a width substantially equal to the width of the separator.

8. The combine of claim 7, in which the blower is an induction-type blower.

9. The combine of claim 1, in which the disks are mounted on the shafts and separated by spacers having an outer diameter which defines said close fit between the outer periphery of each interdigitated disk and said adjacent shaft.

10. The combine of claim 6, in which the air vane is positioned to direct said stream of air with a greater velocity at the upstream end of the disk separator than at the downstream end thereof.

11. The combine of claim 1, in which substantially all of said stream of air is directed to pass through the disk separator.

12. A peanut combine having means for lifting peanut-carrying vines from the ground to a series of means for thrashing the peanuts from the vine, a screen below the last thrashing means which will permit peanuts to fall therethrough and retain vine remnants, means for subsequently returning the vine remnants back to the ground, and means downstream of said last thrashing means for separating the peanuts from associated foreign material, said separating means comprising:
   a disk separator assembly positioned downstream and vertically below the screen;
   said disk separator assembly having a plurality of parallel shafts rotatably mounted in a generally horizontal plane;
   each shaft carrying a plurality of flexible springy disks spaced along its length, with the distance between adjacent shafts and the spacing of the disks along adjacent shafts being such that the disks interdigitate to define a plurality of openings between adjacent disks which will permit a peanut of a desired shape and size to pass therethrough and the space between each disk periphery and the adjacent shaft defining a close fit so that a peanut cannot pass therethrough;
   means for rotatably driving said shafts so that the driven disks all rotate in the downstream direction along the upper surface of the disks;
   blower means located upstream of and vertically below the disk separator and a duct connecting the blower means to the underside of the disk separator so that a stream of air from the blower means will pass upwardly and rearwardly through the disk separator, said stream of air being of a velocity to carry lightweight foreign material away from the peanuts passing down between the separator disks; and
   said blower means being of substantially the same width as the disk separator and at least one air vane in the duct for directing the air stream as desired over the under-surface of the disk separator.

13. The combine of claim 12, in which at least some of said disks have serrated edges.

14. The combine of claim 12, including an air vane means located in said duct for orienting the distribution of said stream of air over the lower surface of the disk separator.

15. The combine of claim 14, in which the air vane means is positioned to direct said stream of air with a greater velocity at the upstream end of the disk separator than at the downstream end thereof.

16. The combine of claim 12, in which substantially all of said stream of air is directed to pass through the disk separator.

* * * * *